(12) United States Patent
Staudenmaier et al.

(10) Patent No.: US 9,529,547 B2
(45) Date of Patent: Dec. 27, 2016

(54) MEMORY DEVICE AND METHOD FOR ORGANIZING A HOMOGENEOUS MEMORY

(75) Inventors: Michael Staudenmaier, Munich (DE); Vincent Aubineau, Gif sur Yvettes (FR); Iosef E. Martinez-Pelayo, Zapopan (MX)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 171 days.

(21) Appl. No.: 14/342,449

(22) PCT Filed: Oct. 21, 2011

(86) PCT No.: PCT/IB2011/002956
§ 371 (c)(1),
(2), (4) Date: Mar. 3, 2014

(87) PCT Pub. No.: WO2013/057532
PCT Pub. Date: Apr. 25, 2013

(65) Prior Publication Data
US 2014/0223128 A1 Aug. 7, 2014

(51) Int. Cl.
*G06F 3/06* (2006.01)
*G06F 12/02* (2006.01)
(Continued)

(52) U.S. Cl.
CPC ........... *G06F 3/0644* (2013.01); *G06F 3/0619* (2013.01); *G06F 3/0679* (2013.01);
(Continued)

(58) Field of Classification Search
CPC ... G06F 11/1076; G06F 11/10; G06F 11/1044; G06F 12/0246; G06F 3/064; G06F 2212/7201; G06F 3/0679; G06F 2212/2022; G06F 3/0644
See application file for complete search history.

(56) References Cited

U.S. PATENT DOCUMENTS 5,359,569 A * 10/1994 Fujita et al. .................. 365/229
6,397,290 B1    5/2002 Williams et al.
(Continued)

FOREIGN PATENT DOCUMENTS

EP    0668561 B1    4/2002

OTHER PUBLICATIONS

Mariani Riccardo et al: "Scrubbing and Partitioning for Protection of Memory Systems", On-Line Testing Symposium, 2005. IOLTS 2005. 11th IEEE International, Jul. 6-8, 2005, pp. 195-196.
(Continued)

*Primary Examiner* — Reginald Bragdon
*Assistant Examiner* — Thanh Vo

(57) ABSTRACT

A memory device comprising a memory controller and a homogeneous memory accessible by the memory controller, wherein the homogeneous memory is divided by the memory controller in a first memory partition and a second memory partition, wherein the first memory partition is allocated to a first type of information comprising user data and ECC data that are arranged interleaved with the user data, and wherein the second memory partition is allocated to a second type of information comprising further user data.

20 Claims, 6 Drawing Sheets

(51) Int. Cl.
*G06F 11/10* (2006.01)
*G06F 12/14* (2006.01)

(52) U.S. Cl.
CPC ...... *G06F 11/1012* (2013.01); *G06F 12/0223* (2013.01); *G06F 12/0246* (2013.01); *G06F 12/14* (2013.01)

(56) References Cited

U.S. PATENT DOCUMENTS

| | | |
|---|---|---|
| 7,117,421 B1 | 10/2006 | Danilak |
| 8,572,598 B1* | 10/2013 | Kumar et al. ............... 717/168 |
| 2004/0196707 A1* | 10/2004 | Yoon et al. ......... G06F 12/0246 365/200 |
| 2004/0268063 A1* | 12/2004 | Lasser ........................ 711/154 |
| 2005/0086567 A1* | 4/2005 | Cronch ....................... 714/746 |
| 2006/0179362 A1 | 8/2006 | Alves et al. |
| 2007/0002612 A1* | 1/2007 | Chang et al. ........... 365/185.01 |
| 2008/0229176 A1 | 9/2008 | Arnez et al. |
| 2009/0106480 A1* | 4/2009 | Chung ........................ 711/100 |
| 2009/0319734 A1* | 12/2009 | Aihara ........................ 711/161 |
| 2010/0235580 A1 | 9/2010 | Bouvier |
| 2011/0029726 A1 | 2/2011 | Fujimoto |
| 2012/0272123 A1* | 10/2012 | Yeh ............................ 714/773 |

OTHER PUBLICATIONS

International Search Report and Written Opinion correlating to PCT/IB2011/002956 dated Jul. 27, 2012.

* cited by examiner

MEMORY DEVICE AND METHOD FOR ORGANIZING A HOMOGENEOUS MEMORY

FIELD OF THE INVENTION

This invention relates to a memory device and a method for organizing a homogeneous memory.

BACKGROUND OF THE INVENTION

Modern computer devices, for example, a system on a chip used as an electronic control unit in a vehicle, often perform a plurality of tasks, wherein a first task is related to critical user data and a second task is related to non-critical user data. Critical user data may be, for example, user data which impacts the operational safety of the computer device if unintended modifications of the user data occur. Non-critical user data may be, for example, user data which does not impact the operational safety of the computer device if unintended modifications of the user data occur. An example of non-critical user data may be a background image on a display of the computer device.

In order to protect the critical user data from unintended modifications, it is known to use ECC (Error Correction Code) protected memory. Additional ECC data of the ECC protected memory allows identifying and correcting errors. The non-critical user data can be stored in a conventional memory without ECC protection.

Alternatively, U.S. Pat. No. 7,117,421 describes the emulation of ECC protection with a conventional memory, wherein the stored user data is partly or completely protected by additional ECC data.

Riccardo Mariani, Gabriele Boschi, "Scrubbing and Partitioning for Protection of Memory Systems", iolts, pp. 195-196, 11$^{th}$ IEEE International On-Line Testing Symposium, 2005, proposes to use a memory controller that allows for a configurable partitioning of the addressed memory in a protected and unprotected area.

SUMMARY OF THE INVENTION

The present invention provides a memory device and a method for organising a homogeneous memory as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the Figures are illustrated for simplicity and clarity and have not necessarily been drawn to scale.

DETAILED DESCRIPTION OF THE PREFERRED EMBODIMENTS

Because the illustrated embodiments of the present invention may, for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Although the definition of term hereinafter should not be construed as limiting, the term as used are understood to comprise at least the following.

In the context of this specification, the term "homogeneous memory" comprises a plurality of identical memory cells that can be accessed via a common memory controller.

The term "homogeneous address space" may be used even if one or more address codes within the homogeneous address space are excluded due to detected defects. In this case, the term homogeneous address space refers to a sequence of consecutive address codes, wherein address codes related to defective memory cells are skipped.

The term "memory device" comprises an integrated system on a chip comprising a homogeneous memory and a memory controller for accessing the homogeneous memory. The system on a chip may be built, for example, as a plurality of integrated circuits on a single die or on multiple dies in a single package.

The term "memory controller" comprises an integrated circuit or a plurality of integrated circuits that manages all accesses to the homogeneous memory.

A "threshold" may be a border between distinct memory partitions of the homogeneous memory. For example, the threshold may be the starting address of a continuous address space that represents a memory partition. "Redivide" may be an expression for moving the threshold in the memory to change the size of the memory partitions that are separated by the threshold.

Figure 1:
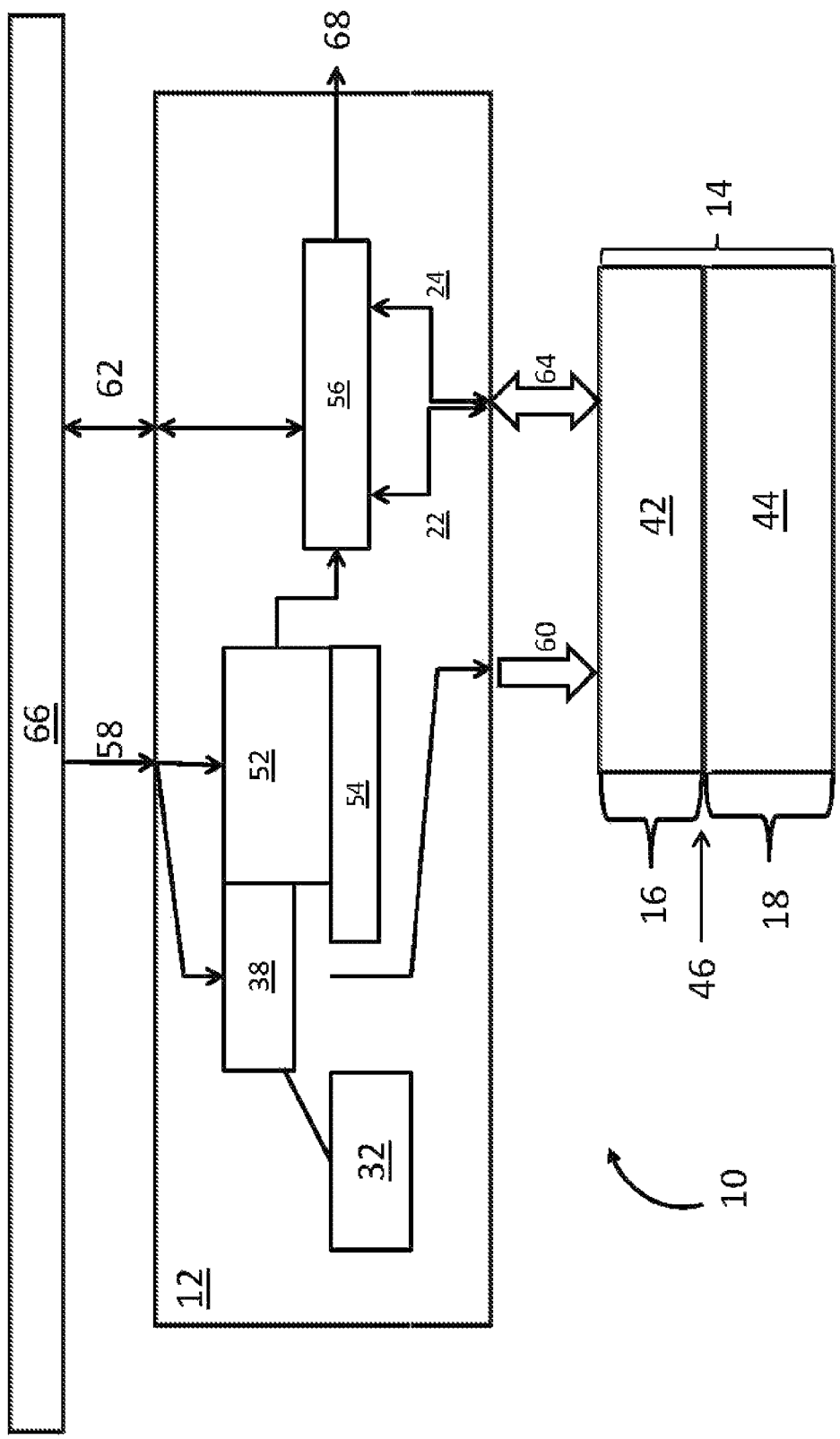
FIG. 1 schematically shows an example of an embodiment of a memory device.

Referring to FIG. 1, an example of a memory device is schematically shown. Reference numeral 10 refers to the memory device itself. The memory device 10 may be part of a vehicle, for example, as an electronic controller unit that may be responsible for various processes comprising critical and non-critical user data. In this context, a vehicle may be, for example, a car, a truck, a boat or an airplane or another motorized, self-propelling vehicle, such as a road vehicle.

The memory device 10 comprises a memory controller 12 and a homogeneous memory 14. The homogeneous memory 14 may be implemented in any manner suitable for all specific implementations and may comprise memory cells that can be independently accessed for reading and writing user data. The homogeneous memory 14 may be implemented in any manner suitable for specific implementations and may, for example, be split into distinct parts or memory partitions. The split or division of the homogeneous memory 14 may be a logical operation that allocates distinct parts of the homogeneous memory for different purposes.

The memory controller 12 may use an address space for managing an access to the homogeneous memory 14. The address space may be a continuous address space consisting of different address codes or simply addresses. This may mean that the continuous address space of the homogeneous memory 14 has a low starting address and a high end address, wherein all address codes are consecutive. Each memory cell of the homogeneous memory 14 may be accessed using an address code that lies between the low starting address and the high end address. "Bottom-up" may describe the use of a sequence of consecutive address codes starting with a low address code, for example, the starting address. "Top-down" may describe the use of a descending sequence of consecutive address codes starting with a high address code, for example, the end address.

The homogeneous memory 14 may be accessible by the memory controller 12 and, for example, may be coupled thereto through a suitable connection. The memory controller 12 of the memory device 10 may be coupled to external components (not shown in this Figure), for example, via a bus 66.

The memory controller 12 may be arranged to divide the homogeneous memory 14 into a first memory partition 16 and a second memory partition 18. In particular, the homogeneous memory 14 may be portioned dynamically in a first memory partition 16 and a second memory partition 18. The possibility to divide the homogeneous memory 14 into the first memory partition 16 and the second memory partition 18 may allow the use of the same memory device 10 for different applications that need different amounts of ECC protected memory. This may reduce the overall cost of the memory device 10 because the same memory device 10 may be used with different settings. The first memory partition 16 may contain a first type of information while the second memory partition 18 may contain a second type of information. In other words, the first memory partition 16 may be allocated to the first type of information and the second memory partition 18 may be allocated to the second type of information. The first type of information may comprise, for example, user data 22 and ECC data 24. The user data 22 may be critical data. The ECC data 24 may be correlated to the user data 22 and may be used for protecting and correcting the corresponding user data 22. The ECC data 24 may be arranged interleaved with the user data 22. This may mean, for example, that user data 22 is followed by the corresponding ECC data 24 such that these two data parts build a closed set of information, for example, the first type of information. The second type of information may comprise further user data as will be described later. The further user data may be non-critical data, for example, image data. The homogeneous memory may be split in any manner suitable for the specific implementation. For example, a border between the first memory partition 16 and the second memory partition 18 may be defined, for example, by a threshold 46 that may separate them from each other. Thus, memory controller 12 may be arranged to divide the homogeneous memory 14 based on the threshold 46. The threshold 46 may describe or represent a lower boundary of the second memory partition 18 and/or an upper boundary of the first memory partition 16. The threshold 46 may be an address code of a memory unit that corresponds to a low starting address of the second memory partition 18 or a high end address of the first memory partition 16 as will be explained below. The threshold 46 simultaneously defines the maximum sizes of the first memory partition 16 and the second memory partition 18 by dividing the homogeneous memory 14 in two parts. The maximum size of the first memory partition 16 may define a memory capacity of the first memory partition 16, and the maximum size of the second memory partition 18 may define a storage capacity of the second memory partition 18. The threshold 46 may be initially set to a predetermined starting value. The first memory partition 16 may be accessed using a first continuous sub address space 42. The second memory partition 18 may be accessed using a second continuous sub address space 44. The threshold 46 may define the lower boundary of the second continuous sub address space 44. In other words, the threshold 46 may be, for example, a low starting address of the second continuous sub address space 44 or a high end address of the first continuous sub address space 42. It may be also possible to express the threshold 46 as a combination of the starting address and a length of the continuous sub address space. This may also provide the end address of the memory partition as the sum of the start address and the length.

The bus 66 may transmit address data 58 and user data 62 received from the external components to the memory device 10. The address data 58 may be, for example, global address data that may be related to the user data 62. The external components may send both address data 58 and corresponding user data 62 if the memory device 10 is instructed to write them to the homogeneous memory 14. The external components may send just address data 58 if the memory device 10 is instructed to read the corresponding user data 62 from the homogeneous memory 14. Thus, both user data 62 and related address data 58 may be sent to the memory device 10 via the bus 66 if an external component stores user data 62, and address data 58 without user data may be sent to the memory device 10 if an external component reads previously stored user data 58 out.

A comparator 52 may be applied on the address data 58 to check whether the address data 58 points to the first continuous sub address space 42 of the first memory partition 16 or the second continuous sub address space 44 of the second memory partition 18.

The memory controller 12 of the memory device 10 may process the address data 58 to get modified address data 60 for accessing the homogeneous memory 14. For example, when user data 22 of the first type of information is received, related ECC data 24 is generated and may be stored interleaved with the related user data 22 to the first memory partition 16, wherein the user data 22 and the ECC data 24 generated from them are closed sets of information. The ECC data 24 are used by the memory controller 12 for checking the user data 22 if a reading access to the user data 22 occurs. Thus, the memory controller 12 reads the ECC data 24 to check the user data 22. However, a reading access from an external component to the ECC data 24 using the address data 58 is not intended. The modified address data 60 maps the address data 58 to the first memory partition 16 and secures that a subsequent reading access to the stored user data 22 skip the interleaved ECC data 24. The modified address data 60 may be generated, for example, by an address modifier 38. Thus, the address modifier 38 may be arranged to manage accesses to the first memory partition 16 and the second memory partition 18 with respect to a first type of information and a second type of information. The address modifier 38 may use a descriptor 54 for generating the modified address data 60 from the address data 58. The descriptor 54 may, for example, provide additional information about memory areas in the homogeneous memory 14 that are reserved for ECC data 24 in the first memory partition 16. The additional information may be, for example, a formula to calculate the modified address data 60 from the address data 58. Additionally, the address modifier 38 may respect a lookup table 32 that may contain address codes of the homogeneous memory 14 that are excluded from being written to or read out. The lookup table 32 may contain address codes that points to defective memory cells of the homogenous memory 14. Thus, the memory controller 12 may be arranged to maintain a lookup table 32 indicating defective memory 34 in the homogeneous memory 14. The address modifier 38 that may generate the modified address data 60 may be an integral part of the memory controller 12.

The modified address data 60 may be used to access the homogenous memory 14 for reading and writing data via an internal bus 64. The internal bus 64 may be, for example, an 80-bit data bus. The width of the internal bus 64 may be chosen with respect to the width of the external bus 62 such that user data 22 and the corresponding ECC data 24 may be written or read within one cycle. Another width of the internal bus 64 may be chosen as well. User data 22 that was received via the external bus 62 may be sent to an ECC logic 56 of the memory controller 12 for generating ECC data 24 corresponding to the user data 22. Generating ECC data 24 may be skipped if the modified address data points to the second continuous address space that has no ECC protection. User data 22 and ECC data 24 may be stored in the first memory partition 16 of the homogeneous memory 14. The user data 22 may possess, for example, a length of 64-bit. The ECC data 24 may be, for example, 16-bit that was generated by the ECC logic 56. The ECC logic 56 may apply, for example, a Hamming code, a reduced Hamming code or any other known error correction code to generate the ECC data 24 from the user data 22. The ECC data 24 may be, for example, sufficient to correct 2-bit errors in the user data 22 and detect 3-bit errors in the user data 22. The memory controller 12 may store the user data 22 together with the related ECC data 24 using the modified address data 60 to the first memory partition 16.

During a read operation an external component may send the address data 58 via the bus 66 to the memory controller 12 of the memory device 10. The address data 58 may be processed by the address modifier 38 to generate the modified address data 60 that points to specific user data 22.

The previously stored ECC data 24 related to the user data 22 may be identified based on the modified address data 60 if the modified address data 60 points to the first memory partition 16 that provides ECC protection for the stored user data 22. The user data 22, and related ECC data 24, that corresponds to the modified address data 60 may be read via the internal bus 64. The ECC logic 56 may check the read user data 22 on the basis of the related ECC data 24. The checked user data 22 may be sent to the external component via the external bus 62 if no error is detected by the ECC logic 56. A detected error may be corrected based on the ECC data 24 by the ECC logic 54, if possible. The corrected user data 22 may be sent to the external component. If a non-correctable error is detected by the ECC logic 56, the data 22 may not be sent. Furthermore, in case an error is detected an error signal, for example, a hold signal or an interrupt signal may be sent to an interrupt 68, for example, to a processor which in response to the interrupt signal executes an interrupt handler. This may provide the opportunity to start an exception handling process, for example, if the corrupted user data 22 is critical. The error signal may be, for example, a logical signal that may be active high of low. The error signal may be, for example, a single status bit or a more complex signal. The error signal may indicate a non-correctable error (aka hard error) as mentioned before as well as a corrected error, also known as a soft error and the signal may, for example, indicate whether the error is a soft error or a hard error.

The modified address data 60 may alternatively point to the second continuous sub address space 44 of the second memory partition 18. The second memory partition 18 may contain user data without ECC data 24. In this case, the comparator 52 may detect that the modified address data 60 points to the second memory partition 18. The comparator 52 may use the threshold 46 to check whether the modified address data 60 points to the second memory partition 18. As a consequence, the comparator 52 may send a signal to the ECC logic 56 to skip generating ECC data 24 when user data is prepared to be written to the second memory partition and to skip the ECC correction process when unprotected further user data is read out from the second memory partition 18. In this case, the ECC logic 56 simply relays the further user data unchanged. The generation of modified address data 60 will be explained in more detail in connection with the following Figures. It may also be possible to implement the memory device 10 as a method for organizing a homogeneous memory 14.

It may be possible to generalize the division of the homogeneous memory 14 from the first memory partition 16 and the second memory partition 18 to a plurality of separate memory partitions.

Figure 2:
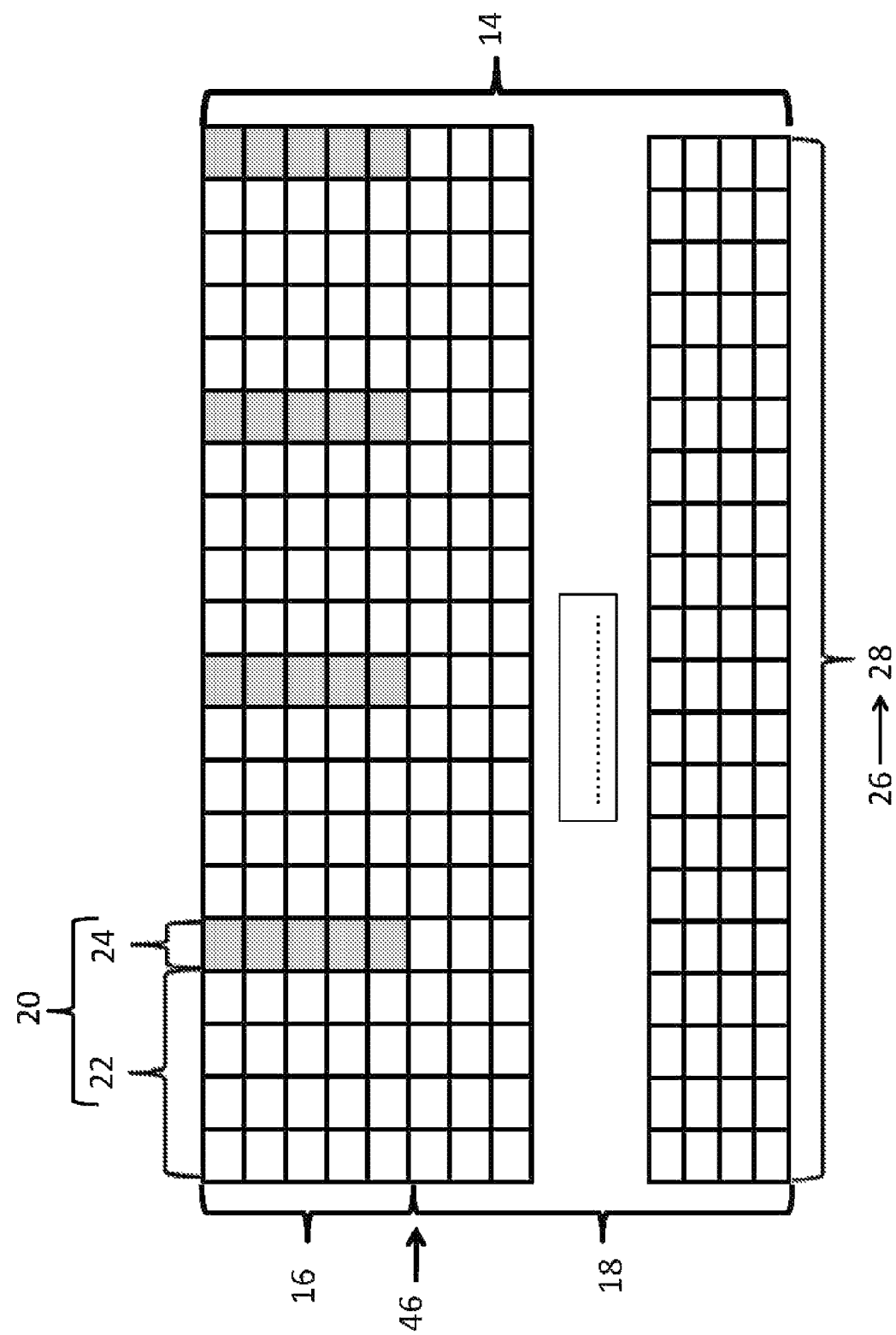
FIG. 2 shows an example of an embodiment of a homogeneous memory.

Now referring to FIG. 2, an example of an embodiment of a homogeneous memory 14 is schematically shown. The homogeneous memory 14 may comprise a first memory partition 16 and a second memory partition 18. The separation between the first memory partition 16 and the second memory partition 18 is defined by a threshold 46. The threshold 46 may, for example, be configured, for example, based on the application, for example, the computer program performed by a processor connected to the device. The threshold 46 may, for example, be dynamic or fixed for the specific application. The first memory partition 16 may consist, for example, of one hundred memory units. A memory unit may comprise, for example, eight memory cells, wherein each memory cell may be capable of storing one byte. The memory units may be, for example, composed of SDRAM or any other known memory technology. The first memory partition 16 may store user data 22 and corresponding ECC data 24. For example, the user data 22 may be stored in four consecutive memory units followed by one memory unit for ECC data 24 such that the ECC data 24 is interleaved with the user data 22. The user data 22 data may have, for example, a length of 64-bit, and the corresponding ECC data 24 may have a length of 16-bit. The ECC data 24 may be generated during the writing process of the user data 22. It may be possible to choose different lengths for the user data 22 and/or the ECC data 24. The user data 22 and the corresponding ECC data 24 may be part of a first type of information 20 that may be stored in the first memory partition 16.

In FIG. 2, the user data 22 is indicated by white squares while the ECC data 24 is indicated by gray squares. The second memory partition 18 may contain further user data 28 that is not protected by additional ECC data. For example, the second memory partition 18 may not contain any additional ECC data at all and that the second memory partition 18 may be completely used for further user data 28.

Figure 3:
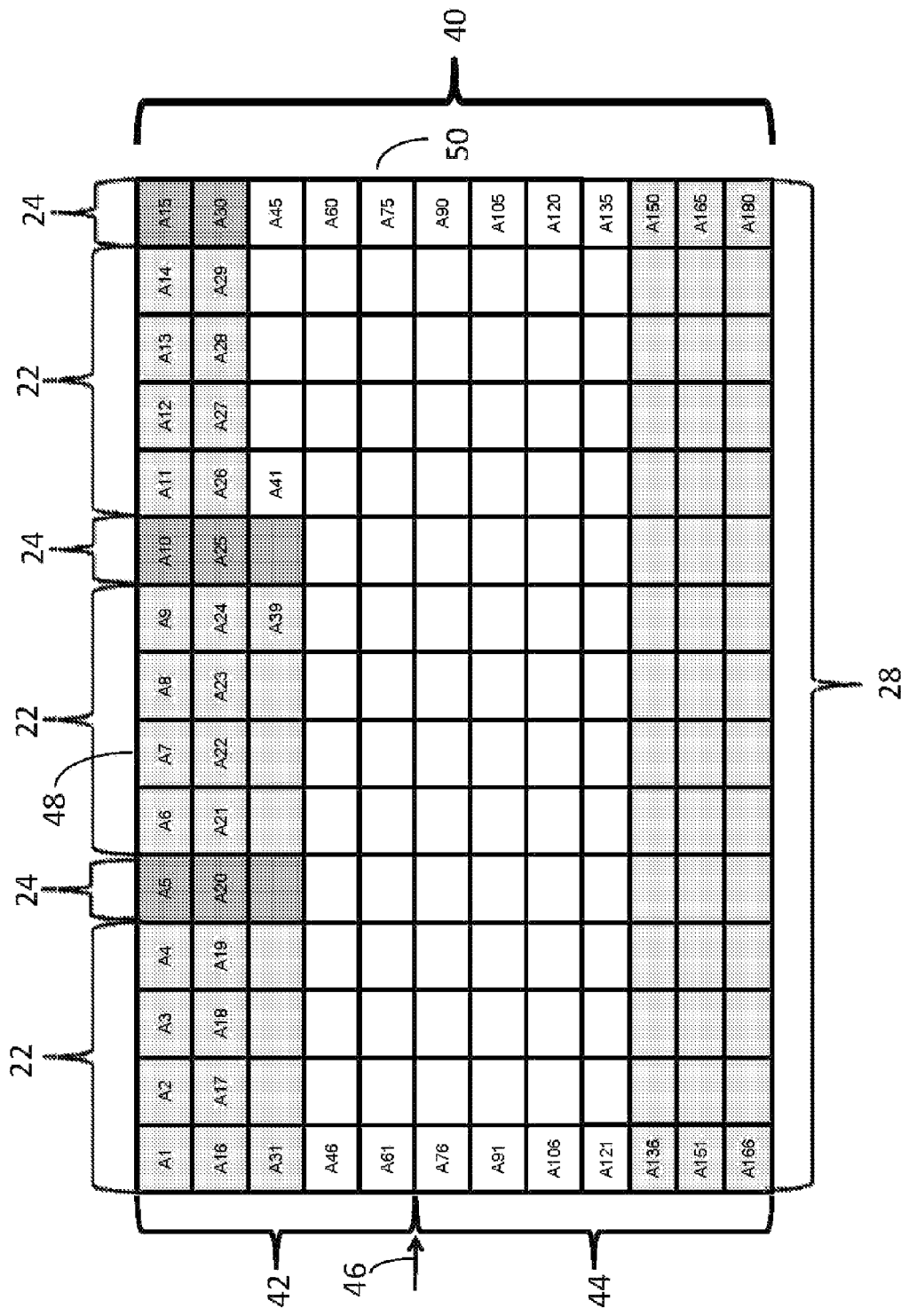
FIG. 3 shows an example of an embodiment of a continuous address space.

The homogeneous memory 14 may comprise a continuous address space 40 as shown in FIG. 3. The continuous address space 40 may be used for accessing the homogeneous memory 14. The continuous address space 40 may be divided, for example, into a first continuous sub address space 42 and a second continuous sub address space 44 of the second memory partition 18. The first continuous sub address space 42 may correspond to the first memory partition 16, and the second continuous sub address space 44 may correspond to the second memory partition 18. The threshold 46 may be used to divide the continuous sub address space 40 into the sub address spaces. The continuous address space 40 of the homogeneous memory 14 may start with an address code A1 and end with an address code A180. The first continuous sub address space 42 may start, for example, with the address code A1 and end with the address code A75. The second continuous sub address space 44 may start, for example, with the address code A76 and end with the address code A180. The threshold 46 may be the starting address A76 or starting address code A76 of the second continuous sub space 44. Thus, a modified address data 60 that is smaller than the address code A76 may point, for example, to the first continuous sub address space 42, and a modified address data 60 that is equal or larger than the address code A76 may point to the second continuous sub address space 44. As a consequence, the second continuous sub address space 44 may be considered as being above the first continuous sub address space 42.

The first continuous sub address space 42 may be used for a first type of information 20 comprising user data 22 and ECC data 24. The ECC data 24 may be, for example, additional data that may be generated by the ECC logic 56 before writing the user data 22 to the first memory partition 16. Consequently, storing user data 22 and corresponding ECC data 24 requires more memory capacity than storing user data 22 without additional ECC data 24. For example, storing the first type of information 20 comprising four memory units of user data 22 and the corresponding ECC data 24 which requires an additional memory unit may increase the overall memory requirements by 25 percent.

Supposing user data 22 of four memory units can be stack in address codes A1-A4, the address code A5 does not contain user data 22 because it may be reserved and used for ECC data 24. The address data 58 may be corrected to skip the interleaved ECC data 24 by the address modifier 38. For example, an address code of the address data 58 may be mapped to a corresponding modified address code of the modified address data 60 by adding an offset value. The offset may be calculated based on the arrangement of the memory units for the ECC data 24. The address modifier 38 may comprise a formula to calculate the offset for each specific memory unit. For example, the offset may be increased by 1 for each 4 consecutive memory units used for user data 22 as it is due to FIG. 3. The memory controller 12 may be arranged to fill up the first memory partition 16 with the first type of information 20 bottom-up. The filling process may be started starting from the starting address code A1 of the first continuous sub address space 42. The occupied memory units in the first continuous sub address space 42 are indicated in gray in FIG. 3 while unoccupied memory units in the first continuous sub address space 42 are indicated as white squares. The last occupied memory unit of the first continuous sub address space 42 may be usually occupied by ECC data 24 because the ECC data 24 corresponding to user data 22 is stored right behind the corresponding user data 22 in the example in FIG. 3. However, an alternative storage scheme, for example, storing the ECC data 24 in front of the correlated user data 22, may be possible. In the example according to FIG. 3, the first unoccupied memory unit in the first memory partition 16 has the address code A41.

The memory controller 12 may be arranged to fill up the second continuous sub address space 44 with a second type of information 26 comprising user data 28 top-down. This may mean that the address modifier may transform address data 58 that originally points to the starting address to the second continuous sub address space 44 to modified address data 60 that points to the end address of the second continuous sub address space 44. In this example, the address code A76 may be changed to the address code A180, and increasing the address code of address data by one may be changed to decreasing the modified address code by one.

Consequently, all unoccupied memory units of the first continuous sub address space 42 and the second continuous sub address space 44 may be arranged as a continuous set of memory units. The memory controller 12 may change the threshold 46 within the unoccupied memory units between the lower address code A41 and the upper address code A135 without disturbing previously stored information. In this example, the threshold 46 may be changed, for example, from A76 to A41.

The first continuous sub address space 42 may have a memory capacity 48 of 75 memory units, wherein each memory unit may be indicated by one square. A remaining memory capacity 50 of the first continuous sub address space 42 may be 35 memory units, as 40 memory units are occupied by user data 22 and ECC data 24 as indicated by the gray and white squares. Changing the threshold 46 from the address code A76 to the address code A41 would reduce the remaining memory capacity 50 to zero because the starting address of the second continuous sub address space 44 may change from the address code A76 to the new starting address code A41.

Figure 4:
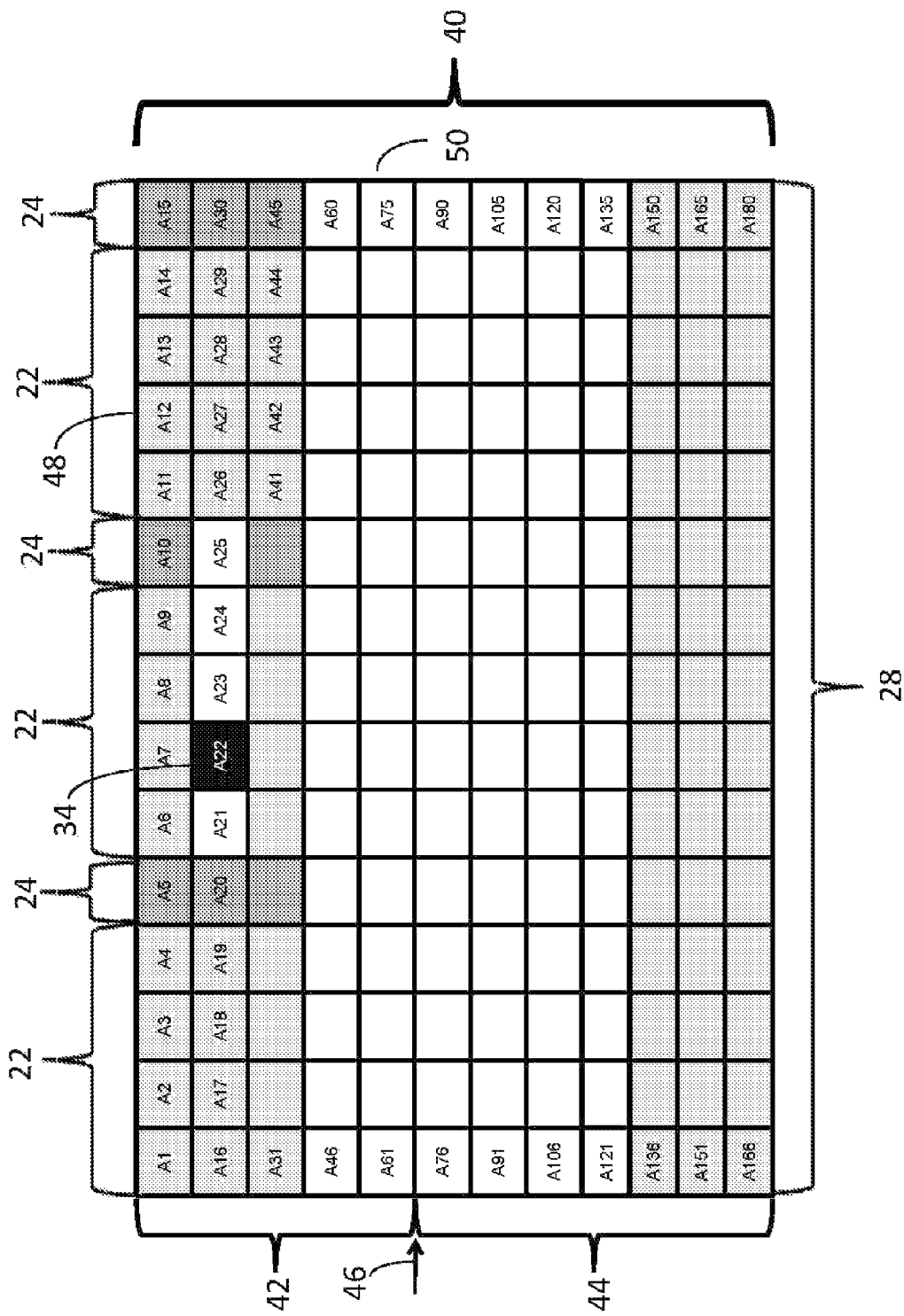
FIG. 4 shows an example of an embodiment of a continuous address space comprising defective memory.

The continuous address space 40 of the homogeneous memory 14 may contain address codes that point to a defective memory unit 34, as shown in FIG. 4. The defective memory unit 34 may be part of the first continuous sub address space 16, for example, may have address code A22. The defective memory unit 34 may be detected, for example, due to an increased bit error rate by the ECC logic 56 of the memory controller 12. The ECC logic 56 of the memory controller 12 may store the address code A22 of the defective memory unit 34 to the lookup table 32 to exclude the defective memory 34 unit from the first continuous sub address space 42 of the first memory partition. As a result, the defective memory unit 34 may be skipped by the address modifier 38, when modified address data 60 is generated from address data 58.

It may be possible to skip more than one consecutive memory unit, as indicated in FIG. 4. For example, if the defective memory unit 34 has the address code A22, the memory units with the consecutive address codes A21 to A25 may be written to the lookup table 32 by the ECC logic 56 to exclude them from the first memory partition 16. This may be convenient because the memory address codes A21 to A25 are connected by the ECC data 24 stored in memory unit A25. To keep the memory capacity 48 of the first memory partition 16, memory units having a higher address code may be used for storing user data 22 and ECC data 24. Thus, the memory controller 12 may be arranged to define the threshold 46 based on a memory capacity 48 needed for the first type of information 20. For example, the memory units having the address codes A41 to A45 may be used to replace the excluded memory units having the address codes A21 to A25. As a result, the threshold 46 may be adapted dynamically if the remaining memory capacity 50 of the first continuous sub address space 42 is exceeded. For example, if the threshold 46 was the address code A41, the memory controller 12 may adapt the threshold 46 to its new value A46 as the new starting address of the second continuous sub address space 44. Thus, the memory controller 12 may be arranged to dynamically redivide the homogeneous memory 14. Dynamically may mean that the adaption of the threshold 46 may occur at any time or clock cycle if necessary.

A defective memory unit 34 in the second memory partition 18 may be handled analogously. However, the detection of the defective memory unit 34 may be, for example, restricted to a memory test routine that may be processed initially during a startup phase. It may be possible that the defective memory unit 34 changes from the first memory partition 16 to the second memory partition 18 and vice versa due to the adapting of the threshold 46. Adapting the threshold 46 to increase the memory capacity 48 may be done with respect to the defective memory units 34 in the first memory partition 16 and/or the second memory partition 18. Thus, memory controller 12 may be arranged to define the threshold 46 with respect to the defective memory units 34 in the homogeneous memory 14.

The reshaping of the threshold 46 may lead to a situation in which the memory units previously occupied by further user data 28 are reassigned from the second memory partition 18 to the first memory partition 16. For example, the threshold 46 may be reset to the address code A151. The further user data 28 stored in the memory units having the address codes A136 to A150 would be consequently outside of the second continuous sub address space 44 of the second memory partition 18. An attempt to access the further user data 28 stored in those reassigned memory units using such an invalid memory address code may lead to a corruption of the protected user data 22 in the first continuous sub address space 42 of the first memory partition 16. However, it may be possible that the further user data 28 is still stored in the reassigned memory units because they have not yet been overwritten. Consequently, it may be useful to allow an access to the second memory partition 18 that, after reshaping the threshold 46, points out of the second memory partition 18 if the access is restricted to read only. Such a restricted access pointing out of the second continuous sub address space 44 enables to avoid corrupting user data 22 or ECC data 24 stored in the first memory partition 16. The memory controller 12 may be arranged to restrict an access to the second memory partition 18 to read only when the access to the second memory partition 18 is related to a part of the homogeneous memory 14 that is allocated to the first memory partition 16. Losing the further user data 28 partly may be acceptable due to the non-critical nature of the further user data 28. The lost part of the further user data 28 may be located at an edge of the picture represented by the image data. Therefore, it may not attract attention if the picture is displayed without the lost part. Another strategy may be to replace the lost information of the further user data 28. The lost information may represent a pixel of an image that may be replaced by a neighboring pixel without attracting attention. Therefore, the memory controller 12 may, for example, automatically change modified address data 60 that after reshaping points out of the second continuous sub address space 44 into modified address data 60 that points in the second continuous sub address space. The change of the modified address data 60 may depend on the resolution of the image data stored in the second memory partition 18.

It may be possible to reduce the further user data 28 stored in the second memory partition 18 by applying a data compression scheme, if a remaining storage capacity of the second memory partition 18 becomes exceeded without the data compression scheme. The data compression scheme may be any suitable lossless compression scheme or lossy compression scheme. Applying a lossy compression scheme to the further user data 28 may be possible due to the non-critical nature of the further user data 28. The further user data 28 may be, for example, image data that has only aesthetic purposes. Thus, the memory controller 12 may be arranged to apply the data compression scheme to the further user data 28 stored in the second memory partition 18 when the homogeneous memory 14 is divided such that the remaining storage capacity of the second memory partition 18 is exceeded by the further user data 28 without the data compression scheme. The data compression scheme may be automatically applied to the further user data 28 by the memory controller 12. The data compression scheme may be, for example, a coarse graining scheme that reduces the resolution of image data stored in the second memory partition 18 and allows a simple interpolation to approximately reconstruct the omitted further user data 28. This may mean that the number of bits stored for each pixel of the image is reduced. Thus, the data compression scheme may replace the original further user data 28 by a lower quality representation. Accessing the further user data 28 via modified address data 60 may include a complex calculation depending on the data compression scheme.

Figure 5:
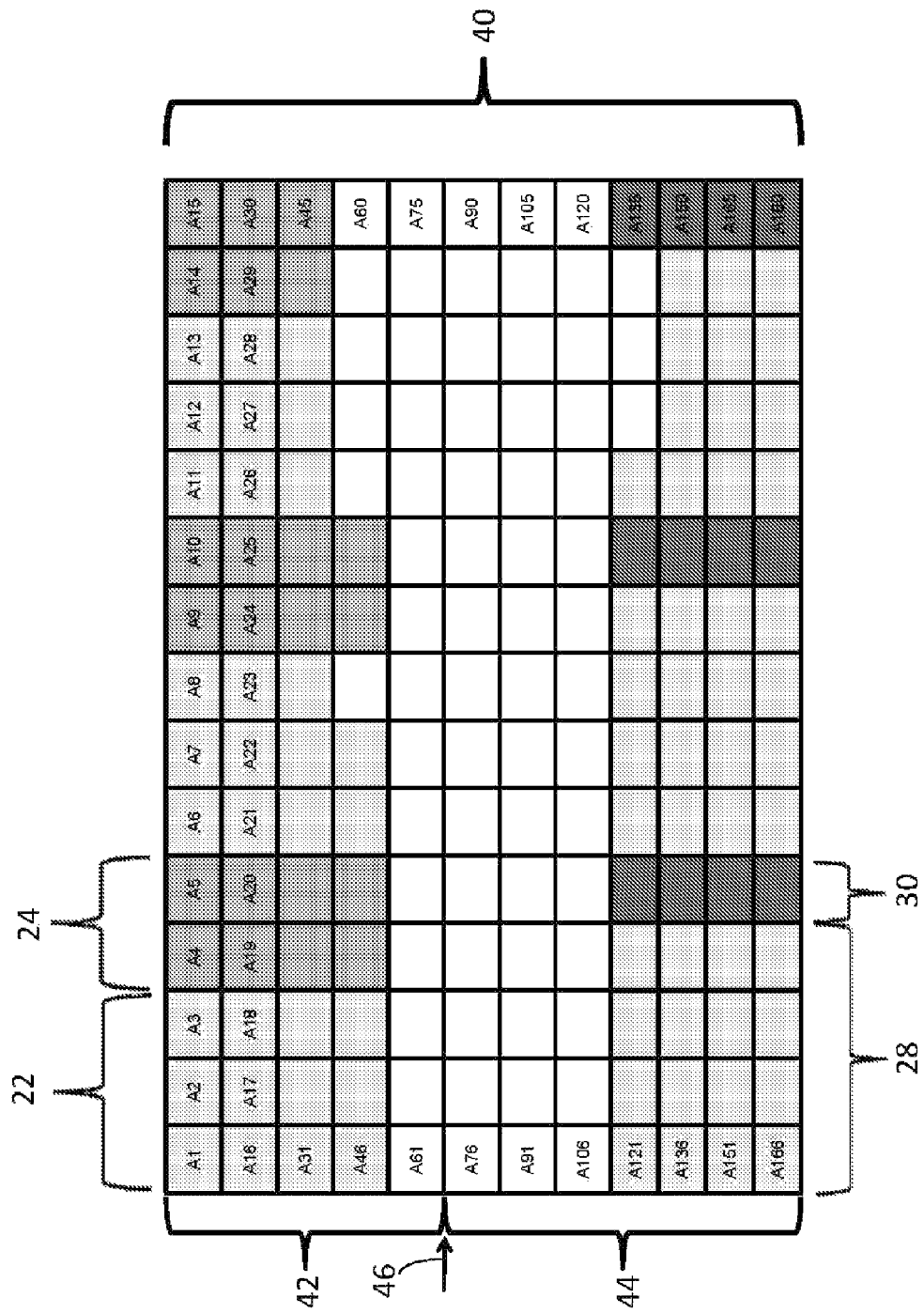
FIG. 5 shows a further example of an embodiment of a continuous address space comprising ECC data.

Referring now to FIG. 5, different types of information may be stored in the first continuous sub address space 42 and the second continuous sub address space 44. The first continuous sub address space 42 may contain, for example, the first type of information 20, and the second continuous sub address space 44 may contain, for example, the second type of information 26. However, the amount of ECC data 24 in the first continuous sub address space 42 may be increased from one fifth to two fifths as indicated in FIG. 5. This may mean that three memory units of user data 22 are used for generating two memory units of corresponding ECC data 24. The different amount of ECC data 24 may be generated, for example, using a different Hamming code or a different reduced Hamming code that may provide higher data integrity of the protected user data 22. The additional ECC data 24 may need additional memory capacities such that the first continuous sub address space 42 may cover, for example, at least 55 memory units. This is indicated by the grey squares. It may also be possible to provide further ECC data 30 for the further user data 28 of the second type of information 26 in the second continuous sub address space 44. This may provide ECC protection for the second type of information 26. It may be possible to choose different ECC algorithms for the first type of information 20 in the first continuous sub address space 42 and the second type of information 26 in the second continuous sub address space 44.

If further ECC data 30 is provided for the further user data 28 of the second type of information, the top-down filling process as described in connection with FIG. 3 has to be modified due to the further ECC data 30. In this case, the address codes of the modified address data 60 has to be further modified the address modifier 38 by adding a further offset value. The further offset value may be calculated by a further formula similarly to the offset value related to the ECC data 24. It is possible to add the further offset value after changing the address codes for the top-down filling process. The further offset value may have a negative value due to the reversed filling direction. For example, the address codes A179 to A176 may comprise the further offset value −1 due to the further ECC data 30 stored at address code A180. The further ECC data 30 stored at address code A180 is related to the further user data 28 stored at the address codes A179 to A176.

The ECC algorithm used in connection with the first type of information 20 and/or the second type of information 26 may be changed based on a detected bit error rate or as a consequence of a signal sent by the ECC logic 56 via the interrupt 68. The bit error rate may be influenced, for example, by cosmic radiation that erratically changes bit values within the homogeneous memory 14. The cosmic radiation increases as the homogeneous memory 14 ascends, for example, in a starting airplane or in a car approaching a mountain pass. To secure the integrity of user data 22 in the first continuous sub address space 42 of the first memory partition 16, it may be necessary to increase the ECC protection due to an increasing bit error rate. Increasing the ECC protection may be possible by using an alternative ECC code for the protected user data 22 that provides an enhanced functionality. For example, a first ECC code may provide a correction up to 2-bit errors and detection up to 3-bit errors, while a second ECC code may provide correction up to 3-bit errors and detection up to 4-bit errors. As an additional feature, it may be possible to use ECC protection with the further user data 28 in the second continuous sub address space 44 to provide ECC protection to the further user 28 data. The variation of the used ECC algorithms may sustain the bit error rate on the further user data 28 and may keep the user data 22 fully protected. Changing the ECC algorithm may increase or reduce the size of the ECC data 24 or the further ECC data 30. Thus, the memory controller 12 may be arranged to adjust the ECC data 24 as a function of the bit error rate. The bit error rate may be detected and/or rated by the ECC logic 56 of the memory controller.

Figure 6:
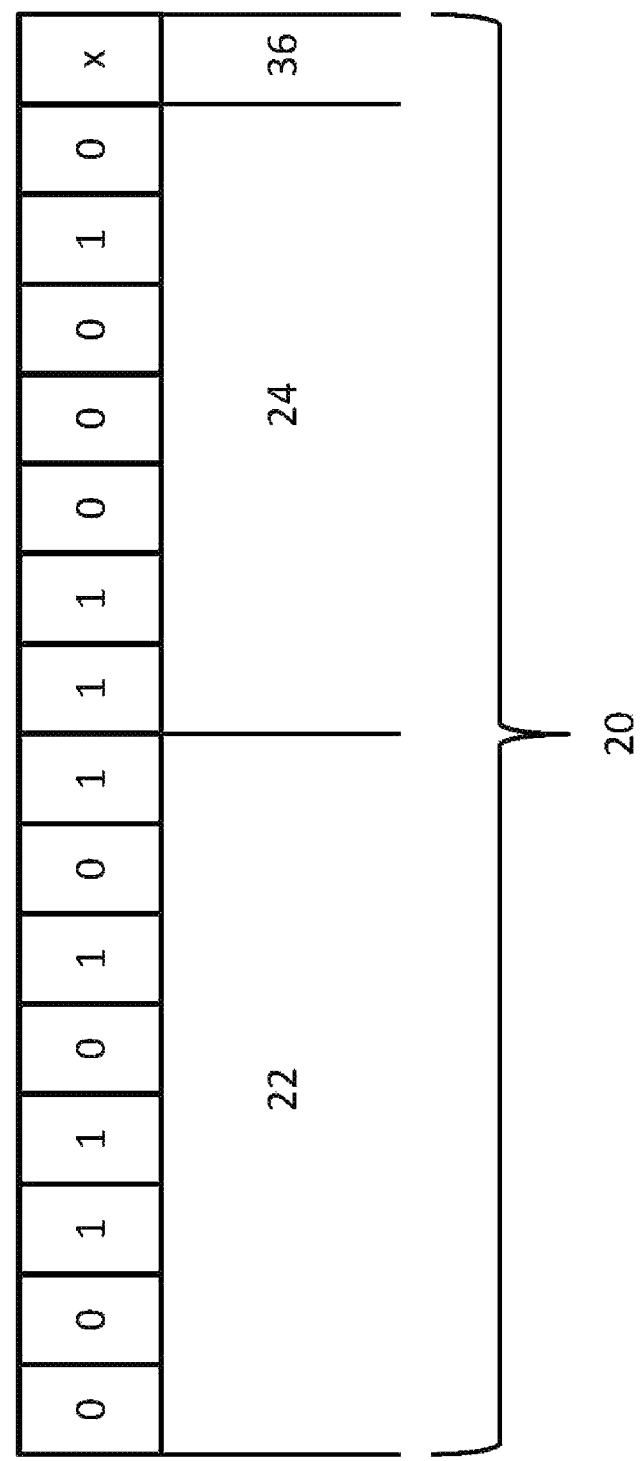
FIG. 6 shows a detailed example of an embodiment of a memory structure comprising user data, ECC data and unused memory bits.

Referring now to FIG. 6, a detailed example of an embodiment of a memory structure comprising user data, ECC data and unused memory bits is shown. The structure may be a schematical representation of the first type of information 20 on a bit level. The first type of information 20 comprises user data 22 and ECC data 24 and may also comprise unused memory bits 36. The user data 22 and the ECC data 24 are indicated by separate memory cells containing bit values of 0 and 1. The user data 22 may comprise, for example, eight separate bit values. The ECC data 24 may comprise, for example, seven separate bit values. It may be possible that unused memory bits 36, which are indicated by an X, exist because adding these unused memory bits 36 to the ECC data 24 may not provide increased ECC protection. Rather, they would increase the number of mathematical operations necessary for generating the ECC data 24 and checking the user data 22 with the ECC data 24. In this example, ECC data 24 having a length of 7 bits may provide the same level of ECC protection for the user data 22 as ECC data 24 having a different length of 8 bits. The amount of unused memory bits 36 may vary depending on the intended protection level provided by the ECC data 24. The unused memory bits 36 may be inserted erratically or may appear in an interleaved manner behind or in front of the ECC data 24. Thus, the first memory partition 16 may comprise unused memory bits 36 that are interleaved with the user data 22 and the ECC data 24. It may be possible to match the size of the ECC data 24 with the user data 22 in a predefined manner. For example, the ECC data 24 and the unused memory bits 36 may be of the same size as the user data 22. According to another example, the ECC data 24 and the additional unused memory bits 36 may be one fifth or two fifths of the user data as shown in FIGS. 2 to 5, wherein the unused memory bits 36 are comprised of the ECC data 24. As a recommended value, it may be possible to calculate the combined length of the user data 22, the ECC data 24 and the unused memory bits 36 such that their combined length is a multiple of a byte, in order to simplify the calculation of the modified address data 60.

It may be possible to use the unused memory bits 36 for storing additional data that may be unprotected. The unused memory bits 36 may be used to store information about the last soft error detected in the first type of information 20. For example, the unused memory bits 36 may be set to "1", if a correctable error was detected during the last access to the user data 22, and it may be set to "0", if no error was detected during the last access to the user data 22. This additional data may be used to detect defective memory units. However, it may be possible that there are no unused memory bits 36 and that the length of the memory structure does not correspond to a multiple of a byte or any other common length. The second type of information 26 may be built analogously to the first type of information 20. In particular, the second type of information 26 may comprise further user data 28, further ECC data 30 and further unused memory bits, wherein all occurring components of the second type of information 26 are interleaved with each other.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the address modifier 38 may comprise the lookup table 32 and the comparator 52. Another possibility for a combination of logical block may the unification of the lookup table 32 and the descriptor 52.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the memory controller may be build a plurality of integrated circuits that are unified on a single semiconductor substrate. As an alternative embodiment, the examples may be implemented as any number of separate integrated circuits or separate devices interconnected with each other in a suitable manner. For example, the memory controller may be a plurality of distinct chips. A memory chip, a controller chip for managing I/O operations with external components and an ECC logic chip that are coupled to each other on a printed circuit board (PCB) may be used as an example for such a plurality of distinct chips.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A memory device comprising
a memory controller; and
a homogeneous memory accessible by the memory controller, the memory controller to divide the homogeneous memory into a first physical memory partition and a second physical memory partition, wherein a boundary between the first physical memory partition and the second physical memory partition is defined by a low starting address of a continuous sub address space of the second physical memory partition, the first physical memory partition is allocated to a first type of information comprising user data and ECC data for the user data, the ECC data being interleaved in the user data, the second physical memory partition is allocated to a second type of information comprising further user data, and in response to a defective memory unit being detected in the homogeneous memory, the memory controller to dynamically redivide the homogeneous memory to change the low starting address of the continuous sub address space of the second physical memory partition based on an address of the detected defective memory unit, wherein the detected defective memory unit is changed either from the first physical memory partition to the second physical memory partition or from the second physical memory partition to the first physical memory partition based on the change in the low starting address of the continuous sub address space of the second physical memory partition.

2. The memory device as claimed in claim 1, wherein the memory controller is arranged to repartition a memory unit of the second memory partition to the first physical memory unit partition to allocate the memory unit to the first type of information, and to restrict an access to the memory unit to read only when the access to the memory unit is related to a part of the homogeneous memory that is allocated to the first physical memory partition.

3. The memory device as claimed in claim 1, wherein the memory controller is arranged to adjust the ECC data as a function of a bit error rate.

4. The memory device as claimed in claim 1, wherein the second type of information comprises further ECC data.

5. The memory device as claimed in claim 1, wherein the memory controller is arranged to maintain a lookup table indicating defective memory in the homogeneous memory.

6. The memory device as claimed in claim 1, wherein the first physical memory partition comprises unused memory bits that are interleaved with the user data and the ECC data.

7. The memory device as claimed in claim 1, wherein the memory controller comprises an address modifier,
    wherein the address modifier is arranged to manage accesses to the first physical memory partition and the second physical memory partition with respect to the first type of information and the second type of information.

8. The memory device as claimed in claim 1, wherein the homogeneous memory comprises a continuous address space,
    wherein the first physical memory partition has a first continuous sub address space and the second physical memory partition has the continuous sub address space above the first continuous sub address space,
    wherein the memory controller is arranged to fill up the first physical memory partition with the first type of information bottom-up, and
    wherein the memory controller is arranged to fill up the second physical memory partition with the second type of information top-down.

9. The memory device as claimed in claim 8, wherein the boundary between the first and second physical memory partitions of the homogeneous memory is based on a dynamic threshold that represents the low address of the second physical memory partition.

10. The memory device as claimed in claim 9, wherein the memory controller is arranged to define the threshold based on a memory capacity needed for the first type of information.

11. The memory device as claimed in claim 9, wherein the memory controller is arranged to apply a data compression scheme to the further user data stored in the second physical memory partition when the homogeneous memory is divided such that a remaining storage capacity of the second physical memory partition is exceeded by the further user data without the data compression scheme.

12. The memory device as claimed in claim 1, wherein a size of the continuous sub address space of the second physical memory partition is reduced in response to the change the low starting address of the continuous sub address space of the second physical memory partition.

13. The memory device as claimed in claim 1, wherein a size of the continuous sub address space of the second physical memory partition is increased in response to the change the low starting address of the continuous sub address space of the second physical memory partition.

14. A method for organizing a homogeneous memory-accessible by a memory controller, comprising:
    dividing the homogeneous memory into a first physical memory partition and a second physical memory partition, wherein a boundary between the first physical memory partition and the second physical memory partition is defined by a low starting address of a continuous sub address space of the second physical memory partition;
    allocating the first physical memory partition to a first type of information including user data and ECC data for the user data, the ECC data being interleaved in the user data;
    allocating the second physical memory partition is allocated to a second type of information including further user data;
    detecting a defective memory unit in the homogeneous memory; and
    in response to the detected defective memory unit, dynamically redividing the homogeneous memory to change the low starting address of the continuous sub address space of the second physical memory partition based on an address of the detected defective memory unit, wherein the detected defective memory unit is changed either from the first physical memory partition to the second physical memory partition or from the second physical memory partition to the first physical memory partition based on the change in the low starting address of the continuous sub address space of the second physical partition.

15. The method as claimed in claim 14, further comprising:
    repartitioning a memory unit of the second physical memory partition to the first physical memory unit partition to allocate the memory to the first type of information; and
    restricting an access to the memory unit to read only when the access to the memory unit is related to a part of the homogeneous memory that is allocated to the first physical memory partition.

16. The method as claimed in claim 14, further comprising: adjusting the ECC data as a function of a bit error rate.

17. The method as claimed in claim 14, wherein the homogeneous memory comprises a continuous address space, wherein the first physical memory partition has a first continuous sub address space and the second physical memory partition has the continuous sub address space above the first continuous sub address space, the method further comprising:
    filling up the first physical memory partition with the first type of information bottom-up, and
    filling up the second physical memory partition with the second type of information top-down.

18. The method as claimed in claim 17, wherein the boundary between the first and second physical memory partitions of the homogeneous memory is based on a threshold that represents the low address of the second physical memory partition.

19. The method as claimed in claim 18, wherein the threshold is defined based on a memory capacity needed for the first type of information.

20. The method as claimed in claim 18, further comprising: applying a data compression scheme to the further user data stored in the second physical memory partition when the homogeneous memory is divided such that a remaining storage capacity of the second physical memory partition is exceeded by the further user data without the data compression scheme.

\* \* \* \* \*